United States Patent [19]

Muller

[11] 4,349,639

[45] Sep. 14, 1982

[54] METHOD OF MAKING AND THE COMPOSITION FOR AN INITIALLY ERASABLE INK FOR A BALL POINT WRITING INSTRUMENT

[75] Inventor: Frank A. Muller, West Los Angeles, Calif.

[73] Assignee: Scripto, Inc., Doraville, Ga.

[21] Appl. No.: 247,982

[22] Filed: Mar. 26, 1981

[51] Int. Cl.$^3$ .................... C09D 11/18; C09D 11/10; C09D 11/08

[52] U.S. Cl. ........................................ 523/161; 8/558; 106/22; 106/23; 106/27; 106/28; 106/29; 106/30; 106/32; 260/DIG. 38; 401/17; 401/18; 401/21; 401/34; 524/88; 524/143; 524/296; 524/297; 524/383; 524/385; 524/476; 524/571

[58] Field of Search ................. 260/33.6 A, 33.6 AQ, 260/33.6 PQ, 31.8 G, 23.7 M, 31.8 M, 31.8 HR, 31.8 PQ, 5, DIG. 38, 42.21; 106/22, 23, 27–30, 32; 401/17, 18, 21, 34; 8/558

[56] References Cited

U.S. PATENT DOCUMENTS

| | | | |
|---|---|---|---|
| 3,875,105 | 4/1975 | Daugherty et al. | 106/19 |
| 3,991,007 | 11/1976 | Perronin et al. | 260/42.21 |
| 4,097,290 | 6/1978 | Muller et al. | 106/32 |
| 4,183,833 | 1/1980 | Miyaguchi et al. | 260/DIG. 38 |
| 4,193,906 | 3/1980 | Hatanaka | 106/19 |
| 4,244,862 | 1/1981 | Handa et al. | 260/42.21 |
| 4,256,492 | 3/1981 | Matsumoto et al. | 106/23 |
| 4,256,494 | 3/1981 | Yamamoto et al. | 106/23 |

FOREIGN PATENT DOCUMENTS 2030159 4/1980 United Kingdom .

OTHER PUBLICATIONS

Chem. Abs. 94, (141410m), 1981 "Ink Compositions for Ballpoint Pens", Pilot Pen 80, 152,769.
Derwent Abs. 00911, (C/01), Nov. 21, 1979, "Erasable Ink for Writing Board . . .".
Derwent Abst. 89830 X/48, Oct. 28, 1976, "Easily Erasable Marking Ink", Pentel.
Derwent Abst. 81055 A/45, Oct. 4, 1978, "Easily Erasable . . . ", Pilot Pen J53113631.
Derwent Abst. 64174 B/35, 8-10-79, RD-184006.
Derwent Abst. 8262 Y/05, Dec. 14, 1976, Pilot Fountain Pen J51145639.
Derwent Abst. 8263 Y/05, Dec. 14, 1976, Pentel KK J51145640.
Derwent Abst. 794 W/01, Dec. 3, 1974, Taisei Kasei, J74045334.

*Primary Examiner*—Melvyn I. Marquis
*Assistant Examiner*—Herbert J. Lilling
*Attorney, Agent, or Firm*—Newton, Hopkins & Ormsby

[57] ABSTRACT

A method for making and the composition for an initially erasable ink for a ball point writing instrument which ink is characterized by its initial erasability by ordinary pencil erasers when applied by a ball point writing instrument to an absorbent paper-like writing surface and which thereafter develops permanence. The method includes the steps of: (a) selecting elastomeric material from the group consisting of natural rubbers, synthetic rubbers and mixtures thereof; (b) masticating the selected elastomeric material by subjecting same to high shear stresses; (c) coloring said masticated elastomeric material by forced impregnation of colored pigments into said elastomeric material while subjecting same to further shear stresses; and (d) mixing the pigmented elastomeric material with a solvent system that includes a volatile component and an essentially non-volatile low viscosity component in the form of a hydrocarbon oil, an essential oil, a petroleum derivative, a plasticizer or mixtures thereof to form an erasable ink composition. The ink composition comprises a pre-pigmented elastomer and a solvent system that contains a volatile component and an essentially non-volatile low viscosity component.

18 Claims, No Drawings

METHOD OF MAKING AND THE COMPOSITION FOR AN INITIALLY ERASABLE INK FOR A BALL POINT WRITING INSTRUMENT

CROSS-REFERENCE TO RELATED APPLICATIONS

This is a continuation-in-part of applicant's prior co-pending application Ser. No. 247,363, filed Mar. 15, 1981.

BACKGROUND OF THE INVENTION

1. Field of the Invention

The present invention pertains to a method of making and the composition for an initially erasable ink for a ball point writing instrument which ink is characterized by its initial erasability by ordinary pencil erasers when applied by a ball point writing instrument to an absorbent paper-like writing surface and which thereafter develops permanence.

2. Description of the Prior Art

Many frequently interrelated factors must be taken into account in the formulation of a writing medium. These factors fall into two categories, namely, those which stem from the type writing instruments to be used in dispensing the writing medium onto the writing surface, and those which are concerned with the desired characteristics that the writing medium possesses after being dispensed.

The principal type of writing instrument that is to be used with the ink composition of the present invention is a ball point writing instrument.

Insofar as the characteristics of the writing medium in the "after dispensed" state are concerned, appearance and relative indelibility are the most important. In most cases, the appearance of the writing medium means little more than the color of the written line. Indelibility is related to the ease of removal of the written line. Thus, an indelible writing medium is one which is resistant to removal from the writing surface. Obtainment of a high degree of indelibility is not always necessarily desirable. In some instances one may want a writing medium which immediately is not easily removable by mechanical means from the writing surface, while in other instances one may want a writing medium which at least initially is easily removable but which may attain permanence or indelibility over an extended period of time, as for example, over a period of hours. If such a medium is to be considered as being truly erasable, it must be readily removable at least during an initial period of time from the substratum to which it has been applied without any damage of any significant degree to the area of the substratum involved.

In order to understand the nature of this invention, consideration must first be given to the conditions which the formulator of an erasable writing medium must avoid. This in turn requires at least an elementary knowledge of the structure of paper, since paper is the substratum most commonly employed as a writing surface.

Paper is essentially a mat of randomly oriented cellulose fibers. Thus, paper consists of solid structural members, namely the cellulose fibers, having numerous minute voids therebetween. From the description, it may readily be seen that the formulator or designer of an erasable writing medium must prevent the colorant portion of the medium from penetrating to any substantial degree into the voids in the surface being written upon because if there is substantial penetration into the voids the subsequent removal of the colorant by mechanical means cannot be accomplished without damage to the writing surface. Likewise, it may readily be seen that for a writing medium to be erasable, the colorant particles must be prevented from affixing themselves with any substantial degree of permanence, either by chemical reaction or as a result of mere physical attraction, to the solid members of the paper substratum.

In the past, attempts to achieve an erasable writing medium for a ball point pen usually have been unsuccessful. Of course, one may use a superabrasive eraser to remove ordinary ball pen inks from the paper substratum normally used for writing purposes. As discussed above, such substratum is porous to some degree and the ball pen inks in ordinary usage tend to penetrate those pores. In addition, the colorants in such inks tend to affix themselves to the fibers which constitute the solid portion of the substratum. Therefore, the only way to erase markings made with ordinary ball pen inks is to physically remove a substantial number of the fibers in the vicinity of the markings. As a result, the paper substratum is generally so damaged during the erasure process that it is rendered unsuitable for any further use as a writing surface.

Attempts have been made to modify ordinary ball pen ink so as to prevent the colorant portion thereof from penetrating the pores of the paper substratum. These attempts consisted of substituting pigment-type colorants for the dye-type colorants normally used in ball pen inks. The reasoning behind this approach was that since pigment-type colorants normally have a greater particle size than dye-type colorants, the pigment-type colorants would become substantially immobile on deposition upon the surface of the paper substratum and, therefore would not tend to penetrate into the pores of the paper. However, this line of reasoning overlooked the fact that in a ball point writing instrument, the ink is dispensed through a very minute clearance between the ball and socket and that any pigment-type particle which is small enough to be so dispensed will tend to behave as if it were a dye-type particle. Therefore, the colorant portion of such inks was not immobilized to any significant degree and as a consequence, no substantial advantage was gained through substituting the pigment-type colorants for the dye-type colorant in ordinary ball pen inks insofar as erasability was concerned.

As stated above, if a writing medium is to be erasable, the colorant content therein, after being dispensed onto the paper substratum, must remain in such a location that it can be readily removed therefrom with a substantially non-abrasive eraser. Further, the colorant must not be allowed to affix itself either through chemical reaction or through ordinary physical attraction with any substantial degree of permanence to the written-upon surface. If these objectives are to be accomplished, the colorant content of the writing medium must be prevented from penetrating the pores of the substratum and must be shielded from intimate contact with the solid members of the writing surface. Further, if such a medium is to be dispensable from a ball point pen, it follows that the medium must possess physical characteristics which do not differ widely from those of ordinary ball pen inks.

Some success has been achieved in producing erasable ball point pen inks that are transitorily erasable, for example, my prior U.S. Pat. No. 4,097,290 hereinafter referred to as Muller et al. and U.S. Pat. No. 3,875,105 to Daugherty et al. Both of these patents teach the use of an elastomer. The Daugherty et al. patent teaches polyvinyl methyl ether and the parent application thereof, Ser. No. 751,759, teaches Natsyn 2200 which is a synthetic rubber having a chemical structure like natural rubber, while my prior Muller et al. patent teaches natural rubber or rubber which essentially duplicates the chemical structure of natural rubber. Both patents disclose the use of a volatile solvent. At this point it should be noted that the term "solvent" is being used herein as a general form of art and not in its specific technical sense to describe the vehicle into which large elastomer molecules, which may tend to remain in small clusters, are distributed and wherein the vehicle serves to carry the elastomer molecules from within a ball pen cartridge onto the substrate.

Daugherty et al. discloses the volatilizing component as being a solvent for the polyvinyl methyl ether matrix and having an evaporation rate of 3 to 15 on a relative numerical scale on which ethyl ether is assigned an evaporation rate of 1. Daugherty et al. also teaches the possible inclusion of non-volatile solvents for use as pigment dispersing agents of viscosity adjustment solvents. My prior Muller et al. patent discloses a volatile low boiling organic solvent for the elastomer having a boiling point less than 180° C. and exhibiting 100% evaporation within 60 minutes in combination with a non-volatile organic liquid solvent having a high boiling point in excess of 300° C. In summary, both my prior Muller et al. patent and the Daugherty et al. patent teach an erasable ink that includes the following: (1) the use of a pigment as a colorant; (2) an elastomer; and (3) the use of mixtures of volatile and non-volatile solvents.

Such prior attempts at an erasable ink have not been completely successful. One prior art method of making an erasable ink composition discloses a procedure in which a pigment paste is described as being stirred with a previously dissolved quantity of natural crepe rubber has resulted in exceptional consumer detriments that include virtual non-writers, pens that show excessive oozing of ink during writing and traces of ink that do not erase without damaging the paper surface.

The below-listed prior United States patents are made of record herein under 37 C.F.R. §1.56:

| U.S. Pat. No. | ISSUE DATE | INVENTOR |
| --- | --- | --- |
| 2,715,388 | August 16, 1955 | Cofield, Jr., et al. |
| 2,833,736 | May 6, 1958 | Glasser |
| 2,852,397 | September 16, 1958 | Goessling |
| 2,852,398 | September 16, 1958 | Goessling |
| 2,853,972 | September 30, 1958 | Cofield, Jr. |
| 2,956,038 | October 11, 1960 | Juelss et al. |
| 3,099,252 | July 30, 1963 | Cofield, Jr. |
| 3,425,779 | February 4, 1969 | Fisher et al. |
| 3,875,105 | April 1, 1975 | Daugherty et al. |
| 4,097,290 | June 27, 1978 | Muller et al. |

SUMMARY OF THE INVENTION

A method for making and the composition for an initially erasable ink for a ball point writing instrument which ink is characterized by its initial erasability by ordinary pencil erasers when applied by a ball point writing instrument to an absorbent paper-like writing surface and which thereafter develops permanence. The method includes the steps of: (a) selecting elastomeric material from the group consisting of natural rubbers, synthetic rubbers and mixtures thereof; (b) masticating the selected elastomeric material by subjecting same to high shear stresses; (c) coloring said masticated elastomeric material by forced impregnation of colored pigments into said elastomeric material while subjecting same to further shear stresses; and, (d) mixing the pigmented elastomeric material with a solvent system that includes a volatile component and an essentially non-volatile low viscosity component to form an erasable ink composition.

The erasable ink composition of the present invention comprises a pre-pigmented elastomer and a solvent system therefor. The solvent system includes a volatile component and an essentially non-volatile component in which the volatile component has a boiling point less than about 180° C. and said essentially non-volatile component is at least predominantly a low viscosity hydrocarbon oil, an essential oil, a petroleum derivative, a plasticizer or mixtures thereof having a boiling point less than 300° C. and greater than about 180° C. The pre-pigmented elastomer is selected from the group consisting of pre-pigmented natural rubbers, pre-pigmented synthetic rubbers and mixtures thereof and preferably is a mixture of pre-pigmented natural and synthetic rubbers in approximately equal amounts and is present in an amount in the range of about ⅓ to ⅔ by weight of the ink.

Therefore, it is the object of the present invention to produce an erasable ball point ink composition that possesses very smooth writing characteristics and that becomes permanent quicker without compromising its short term erasability by ordinary pencil erasers.

It is the further object of the invention to achieve smooth writing characteristics by utilizing a solvent system that includes an essentially non-volatile component which is predominantly a low viscosity hydrocarbon oil having a viscosity in the range of 1–15 cps and a boiling point that is above 180° C. and below 300° C. at atmospheric pressure.

It is the further object of the present invention to restrict the presence of any non-volatile component of the solvent system having a viscosity substantially above 15 cps and a boiling point above 300° C. to an amount less than 15% of the weight of the ink.

It is the further object of the present invention to produce an erasable ink composition that comprises a pre-pigmented elastomer and a unique solvent system that includes a volatile component and an essentially non-volatile component in which the volatile component has a boiling point less than about 180° C. and said essentially non-volatile component is at least predominantly a low viscosity hydrocarbon oil having a boiling point greater than 180° C. and less than 300° C. The pre-pigmented elastomer is selected from the group consisting of pre-pigmented natural rubbers, pre-pigmented synthetic rubbers and mixtures thereof and preferably is a mixture of pre-pigmented natural and synthetic rubbers in approximately equal amounts and is present in an amount in the range of about ⅓ to ⅔ by weight of the ink.

It is the further objective of the present invention to utilize a unique method of manufacture that includes the steps of (a) providing a pre-pigmented elastomer component in which pigment is substantially homogeneously distributed throughout and aggregated onto molecular chains of the elastomer; (b) dispersing the elastomer component with molecular chain-attached pigment in a solvent system, the solvent system comprising a volatile component which contributes to initial erasability of the ink and an essentially non-volatile component which contributes to development of permanence of the ink; and (c) controlling initial erasability of the ink composition and capability of subsequently developing permanence when applied to the writing surface with the writing instrument by selecting, for the elastomer component, elastomeric materials which exhibit predetermined molecular weight distribution over a wide molecular weight range.

DESCRIPTION OF THE ILLUSTRATIVE EMBODIMENTS

In this invention, a truly smooth writing erasable writing medium has been obtained by uniquely combining selected materials in selected quantities and which utilizes pigmented elastomeric material and a solvent system that includes an essentially non-volatile low viscosity medium boiling component, while eliminating or drastically limiting the presence of a certain heretofore utilized material, namely, a non-volatile high boiling organic solvent or plasticizer, so as to produce a writing medium which can be successfully dispensed in a ballpoint pen and which is formulated and functions as described hereinbelow.

THE IMPROVED ERASABLE BALL-PEN INK MANUFACTURING PROCESS

A better rubber compounding and subsequent ink mixing process is hereinafter described. This is a process in which cis-polyisoprenes are initially "masterbatched" on a two roll mill prior to solution. This process has been particularly successful, despite the high variability of the properties of rubbers, in deriving maximum degrees of ink performance and uniformity from batch to batch.

Heretofore erasable ball-pen inks essentially consisting of rubber, pigments, solvents and additives are subject to having such consumer appeals as smoothness, erasability, color intensity, and cleanliness of writing which appeals can be compromised primarily by the variability of the types and methods of processing rubbers and secondarily by the quality and uniformity of pigment dispersion in the ink.

The production of the present improved ball-pen ink depends on three primary factors besides its preferred formulation. First, filtering of such high viscosity inks is impractical. Elastomers, and particularly natural cis-1,4-polyisoprene, must thus be selected to have a certified grading in regards to the amounts of included gel and non-rubber solid particles.

Secondly, the elastomers must be correctly masticated. Hard rubber will cause the ink not to flow properly, soft rubber will cause the ink not to erase, or write clearly. Once adequately masticated, the rubber must also remain indefinitely in that state.

Thirdly, the correct method of coloration is important in insuring the quality and uniformity of pigment dispersion. This should be of the maximum homogeneous type so that pigmentation can take place in the early part of the ink making process, followed by complete integration with the remaining elements to eliminate color phase-separation, and to promote optimum erasability by having as many particles of pigment surrounded by or entrapped in as many elastomer molecules as practically possible. All else remaining constant, ink erasability and cleanliness of writing performance characteristics can only be controlled if the pigment is homogeneously dispersed in the elastomer matrix which is, in turn, homogeneously dispersed into the solvent or vehicle to provide an ink having the desired viscosity so that it will not initially penetrate into the paper fibers. Because of their small particle size, approximately 0.05 microns, pigments tend to divide equally between the solvent and elastomer phases. If solvent containing pigments separates from the elastomer matrix either because of dispersion instability, or improper mixing, the viscosity of some localized regions of the ink will be very low resulting in non-erasability concurrent with smudgy writing quality.

1. SELECTION OF THE OPTIMUM TYPES OF ELASTOMERS

Although not restrained to using more than one specie of cis-polyisoprene, I have discovered that further insurance against material or process variability is provided by using 50/50 mixtures of Natsyn 2205 and SMR 5CV60, synthetic and natural rubbers respectively. It is preferable that the elastomeric material or materials chosen exhibit a predetermined substantially uniform molecular weight distribution over a wide molecular weight range of about 100,000 to 900,000.

With the objective of minimizing milling time, the synthetic and natural rubbers chosen are certified to have relatively low, and narrow (20 units) initial Mooney viscosities at 212° F. Unlike other synthetic and natural rubbers both Natsyn 2205 and SMR 5CV60 also have a low level of hard resinous gel particles and extremely low levels of retained dirt (0.05% by weight maximum). It has been found as unique to erasable inks that the use of rubbers that have large gel phases present promotes ink phase-separation while those that have retained dirt cause stoppages during writing, e.g., Natural Pale Crepe, SMR5L Natural Rubber produce significant phase separation because their gel content is not controlled.

2. MASTICATION PROCEDURE

Using a two-roll rubber mill, each peptized elastomer is normally softened separately to the same Mooney viscosity range between 17 and 27, rather than for a fixed time. To provide an optimum balance between plasticity (for writing smoothness and permanence) and residual viscoelasticity (for erasability) the inherently narrower and wider molecular weight distribution types that prevail between synthetic and natural rubber are utilized as complementary safeguards against equipment operating variances. It is helpful during rubber mastication to add a peptizing agent, such as Pepton 44, activated dithio bis-benzanilide, manufactured by the Organic Chemicals Division of American Cyanamid, Bound Brook, N.J.

A suitable type two-roll mill can be obtained from the Farrel Company located in Connecticut. Such a two-roll rubber mill (60"×24") develops the following range of shear forces:

Range:
$2.0 \times 10^6$ to $2.0 \times 10^7$ KG. Meter sec$^{-2}$ (Newtons)
or
$1.3 \times 10^6$ to $1.3 \times 10^7$ FT. Pounds sec$^{-2}$ (Poundals)

The shear force formula for such a two-roll rubber mill is as follows:

$$F = 2 y V R L (1/h_o - 1/h_i)$$

F = total force on rolls
y = viscosity of material
V = surface speed of rolls
R = radius of rolls
L = length of rolls
hi = initial thickness of "sheet".
ho = minimum (nip) thickness of "sheet".

Further changes in viscosity can be retarded by incorporating a small amount of anti-oxidant prior to coloration. A suitable anti-oxidant is AO 2246, 2-2 ethylene bis-[4-methyl-6-tertiary butyl] phenol, also manufactured by the Organic Chemicals Division of American Cyanamid, Bound Brook, N.J.

3. INCORPORATION OF COLOR INTO RUBBER

Subsequent coloration using dry, pre-wetted or preferably pigmented pastes, is performed on the same two-roll mill. Although both premasticated rubber compounds can be combined, a normal procedure has been to color them separately (to minimize weighing errors), with a paste consisting of about 50% pigments dispersed in a rubber compatible vehicle. Suitable rubber compatible vehicles for the pigment paste have been found to include non-volatile high viscosity mineral oils having a viscosity in the range of 50-60 centipoise or more and plasticizers such as dioctyl phthalate, diisodecyl phthalate and tricresyl phosphate. Increased degrees of pigment dispersion have incidently been achieved by incorporating flushed pigments, along with the dry pigments and vehicles that comprise the paste formula which may also include an amount of hydrocarbon resin. (This is useful, particularly when working with relatively light bodied liquids, such as Penreco 2251 oil having a viscosity of 1.45 cps and Penreco 2257 oil having viscosity of 1.5 cps.) By "flushed pigments", I mean viscous commercially available high tinting strength pigment dispersions that are prepared by directly replacing water from presscakes with hydrophobic vehicles such as oils, and varnishes.

The high shear stresses that prevail between the rolls as the rubber and pigment are combined provide for optimum homogeneity. Continuous mixing, cutting and folding not only disperses the pigment, but pre-dissolves the rubber in the paste vehicle to aid subsequent ink mixing as well as preventing chain recombination on storage. Forced pigment impregnation also tends to distribute color uniformly among all the molecular chain lengths, to prevent localized aggregation onto shorter chains that would contribute to non-erasability by being more rapidly absorbed into the paper.

4. INK MIXING PROCEDURE

Once all of the desired pigment has been incorporated, the colored masterbatches are stripped onto protective sheets of polyethylene until such time whence a batch of ink is ready to be made. The approximately $18'' \times 8'' \times \frac{1}{2}''$ sized strips are then cut and weighed for solution in appropriate solvents using a planetary type mixer. A suitable planetary type mixer can be obtained from Ross & Sons Co., Inc. of New York. A 40-gallon mixer will develop the following range of shear forces:
Range:
$1.0 \times 10^3$ to $4.0 \times 10^3$ KG. Meter sec$^{-2}$ (Newtons)
or
$0.7 \times 10^3$ to $3. \times 10^3$ Ft. Pounds sec$^{-2}$ (Poundals)

Alternatively, mixing can be conducted in a sigma-blade kneader mixer. Such a mixer in a 100 gallon size is generally capable of developing the following range of shear forces:
Range:
$5.0 \times 10^3$ to $2.0 \times 10^4$ KG. Meter Sec$^{-2}$ (Newtons)
or
$3.0 \times 10^3$ to $1.5 \times 10^4$ Ft. Pounds Sec$^{-2}$ (Poundals)

Additional pigment paste can be added during the mixing cycle when the mixture of pigmented rubber and solvents have attained a maximum viscosity (to take full advantage of the relatively higher levels of shear that exist in the mixing at maximum viscosity.) Because the walls of the mixing vessel are already coated with a relatively thick viscous layer of colored ink, the likelihood of "free" paste remaining undispersed is minimized. Transfer of ink after a period of approximately three hours mixing time is provided by the use of a diaphragm type pump.

It has been seen from the aforegoing that a sphere of action has been taken to ensure the production of an ink that is optimally suitable for the service conditions it will be required to meet.

SUMMARY

The erasable ball pen ink manufacturing process of the present invention has incorporated the following unique features: (1) pre-selected cis-1,4-polyisoprene rubbers of the correct molecular weight range have been pre-pigmented on a two-roll mill prior to solution; (2) the forced pigmentation has insured uniform distribution of pigment particles, or paste among the rubber matrix; (3) the bulk of the pigmentation has been performed on effectively higher shear equipment rather than in planetary or sigma blade ink mixers to provide for uniform ink coloration without substantially reducing the optimum plasticity and viscoelasticity of the elastomeric matrix; (4) a pigmented paste is preferred to allow sufficient lubricity so that mixing on a two-roll mill does not break down the elastomeric matrix below the optimum Mooney viscosity range; (5) the ink mixing procedure merely requires solution of masticated pre-pigmented elastomers for completion.

ERASABLE INK COMPOSITIONS

Smoother writing erasable ball-pen inks of the present invention have been prepared that eventually become permanent quicker and more efficiently without compromising short-term erasability with a pencil eraser by using very low viscosity solvents (1.0-15 cps) such as light bodied oils that are further characterized by having boiling points or ranges between 180° C. and 300° C. at atmospheric pressure. Furthermore, the content of vehicles whose viscosities are above 15 cps and that boil above 300° C. is minimized, and when used are employed in amount less than 15 percent by weight of the total ink composition.

The purpose of my study was to define the role of these very low viscosity solvents in terms of comparing their effect on ink performance to oils and plasticizers that are significantly more viscous and that boil above 300° C. More specifically, erasable ball-pen inks (particularly those that depend on very volatile solvents to confer erasability using rubbery elastomers) undergo rapid changes in viscosity as the ink film leaves the cartridge via the ball socket onto the writing paper. The performance of higher viscosity oils and plasticizers, although useful for pigment dispersion as dispersants or plasticizers for rubbery and elastomers and as aids to achieving eventual ink permanence, show a direct relationship between their much higher viscosity and the perceived decrease in writing smoothness and the increased length of time required to achieve satisfactory permanence.

The performance of erasable ball-pen inks utilizing essentially non-volatile solvents, such as hydrocarbon oils, boiling between 180° and 300° C. and having significantly lower viscosities than the rubber compatible oils and plasticizers that boil above 300° C. heretofore employed has shown to be in good agreement with the predictions of the equation $dv/dx = (F/A)/V$.* Inks so prepared are smoother and achieve eventual permanence quicker without compromising short-term erasability, pigment dispersion and long term ink stability.

*The above formula is a standard physics formula describing the force necessary to remove a substance from a revolving ball, where:

$dv$ = rate of change of velocity.
$dx$ = rate of change of distance.
$F$ = force.
$A$ = area.
$V$ = viscosity.

Shear stresses between the exposed ball and socket-rim are efficiently reduced if the elastomer pigment matrix is flowing through the pen tip immersed in very low viscosity liquids (1-15 cps) rather than in relatively thicker vehicles (58-104 cps) such as dioctyl phthalate, diisodecyl phthalate or heavy mineral oils. It should be noted that the quantity of preferred volatile solvents (those boiling at about 94°-120° C. and evaporating in less than about 8 minutes) is rapidly diminishing as the ink film passes the socket rim onto the exposed surface of the ball.

In other words, a relatively non-volatile oil such as 2257 from Penreco, which has a viscosity about 39 times less than dioctyl phthalate, offers the rubbery pigment matrix less resistance to flow with the concurrent perception of increased writing smoothness. Through the mechanism of capillarity, the elastomer/pigment-oil matrix also incurs less resistance in penetrating surface paper fibers, again with the resulting decrease in the length of time required to achieve the desired degree of permanence. It should be noted that the rate of capillary absorption is inversely proportional to the viscosity.

Other advantages of using low viscosity essentially non-volatile solvents besides those discussed above are: less stringing, resulting in a cleaner line; less tendency to transfer because of increased penetration of ink into paper; and less tendency of increased writing drag because low viscosity oils or solvents insure against the negative effects of elastomer molecular weights that are higher than the optimum desired values for satisfactory ink manufacturing.

The acceptable range of components for the present invention has been found to be as follows:

TABLE I

| ACCEPTABLE RANGES OF COMPONENTS | | |
| --- | --- | --- |
| Components | Selected Type | % Amount by Weight |
| Elastomeric Polymer | Natsyn 2205 (synthetic rubber) and/or SMR 5CV60 (natural rubber) | 18-28 |
| Colorant | Pigment | 10-22 |
| Volatile Solvent | One compatible with Polyisoprene and having a boiling point less than 180° C., such as Lacquer Diluent #6 | 8-30 |

TABLE I-continued

| ACCEPTABLE RANGES OF COMPONENTS | | |
| --- | --- | --- |
| Components | Selected Type | % Amount by Weight |
| Non-volatile low viscosity solvent having a boiling point at atmospheric pressure from 180° C. and less than 300° C. | Hydrocarbon Oil, Essential Oil, Petroleum Derivative, Plasticizer or Mixtures Thereof | 21-50.5 |
| Non-volatile high viscosity solvent or a plasticizer having a boiling point at atmospheric pressure above 300° C. | Heavy Mineral Oil or Plasticizer | 0 to less than 15 |
| Lubricants | Fatty Acids | 0-5 |
| Other | Hydrocarbon Resin | 0-4.5 |

The preferred range of components, percent by weight of the ink, has been found to be as follows: elastomeric polymer 23-26%, colorant 18-20%, volatile solvent 19-21%, non-volatile low viscosity solvent 26-31%, non-volatile high viscosity solvent less than 5%, and lubricants 2-3%.

The elastomer is selected from the group consisting of natural rubbers, synthetic rubbers and mixtures thereof and preferably is a mixture of pre-pigmented natural and synthetic rubbers in approximately equal amounts. The amount of weight of the pre-pigmented elastomer is calculated to include the combined amounts by weight of the pigment and the elastomer present; and, where a flush pigment or a pigment paste is used may also include in addition to the weight of the elastomer and pigment the combined amount by weight of any resin and high boiling solvent that may be present. The suitable amounts of such pre-pigmented elastomer may vary from about ⅓ to about ⅔ by weight of the ink. Insurance against material or process variability may be provided by using 50/50 mixtures of Natsyn 2205 and SMR 5CV60, synthetic and natural rubbers respectively.

Examples of suitable pigments include Victoria Blue, Alkali Blue, Phthalo Blue, Lithol Red, Red 2B, graphite, carbon black and Diarylide Yellow. The suppliers of such pigments are as follows:

TABLE 2

| SUITABLE PIGMENTS AND THEIR SUPPLIERS | |
| --- | --- |
| Pigment | Supplier and Location |
| Victoria Blue | E.I. DuPont Wilmington, Delaware |
| Alkali Blue | Sherwin-Williams Co. Cleveland, Ohio |
| Lithol Red | Hilton Davis Cincinnati, Ohio |
| Graphite | Acheson Colloid Co. Port Huron, Michigan |
| Carbon Black | Cities Co. Akron, Ohio |
| Red 2B, Phthalo Blue and Diarylide Yellow | BASF Corp. Holland, Michigan |

Other colors will, of course, require the use of other pigments and there is no intent to limit the pigments to those listed. The only requirements of the pigments are that they import the desired color to the ink and that they are sufficiently fine to readily pass through the clearance between the ball and retaining lip of the ball point; i.e., approximately 5 microns or less.

A preferred low boiling point or volatile solvent is Lacquer Diluent #6 supplied by Chem Central Company of Chicago, Ill. which has the property of being compatible with polyisoprene and has a boiling point between 94° C.–120° C. Suitable volatile solvents for the purpose of the present ink composition are considered to be those compatible with rubber having a boiling point less than 180° C. at atmospheric pressure and evaporating in less than 60 minutes. Included among the suitable volatile solvents are V M & P Naphtha having a boiling point range of 121°–139° C. and 100% evaporation in 8.3 minutes, 360-66 Naphtha having a boiling point range of 154°–173° C. and 100% evaporation in 42.1 minutes, as well as very volatile solvents such as hexane and pentane.

Suitable non-volatile low viscosity solvents include liquids having a viscosity within the range of 1–15 cps and having a boiling point less than about 300° C. and greater than about 180° C. and particularly include light bodied oils such as hydrocarbon oils and light mineral oils boiling between 180° C. and 300° C. and having a viscosity around 1.5 centipoise which viscosity is sufficiently low as to result in a final ink viscosity of between 1,000,000 and 4,000,000 centipoise. A preferred example would be Penreco 2257 oil, a product of Penreco, headquartered in Butler, Pa., a division of Pennzoil Company of Houston, Tex. Penreco 2257 oil has a viscosity of 1.5 centipoise at 25° C. and a boiling range of about 220° C. to 260° C. However, the non-volatile low viscosity component may also be a petroleum derivative such as kerosene having the aforesaid low viscosity and low boiling point; a low viscosity, low boiling point essential oil such as pine oil, a terpene alcohol; or this component may be a low viscosity, low boiling point plasticizer such as dimethyl phthalate and KODAFLEX (TXIB) marketed by Eastman Kodak Company, Kingsport, Tenn. Table 3 below presents a listing of the physical properties of such suitable non-volatile low viscosity components, including 2257 oil.

TABLE 3

PHYSICAL PROPERTIES OF SUITABLE NON-VOLATILE LOW VISCOSITY COMPONENTS

| MATERIAL | VISCOSITY (25° C.) | BOILING RANGE (760 mm) | VOLATILITY (100% Evaporation rate*) |
|---|---|---|---|
| 2251 Oil | 1.45 cps | 190–260° C. | >1200 minutes |
| 2257 Oil | 1.50 cps | 222–260° C. | >1200 minutes |
| Kerosene | 1.50 cps | 164–279° C. | >1200 minutes |
| Pine Oil | 1.50 cps | 206–220° C. | >1200 minutes |
| Magie 470 Oil | 1.55 cps | 239–269° C. | >1200 minutes |
| Magie 543 Oil | 1.60 cps | 236–277° C. | >1200 minutes |
| Kodaflex (TXIB) | 2.0 cps | 278° C. | slow >2000 minutes |
| Dimethyl Phthalate | 13.6 cps | 282° C. | slow >2000 minutes |

*As measured on a Shell "EvapoRator".

A suitable non-volatile, high viscosity solvent or plasticizer may be chosen from any one of the compounds listed in Table 4 below, but typically include plasticizers and heavy mineral oils having boiling points in excess of 300° C.

TABLE 4

PHYSICAL PROPERTIES OF TYPICAL HIGH VISCOSITY COMPONENTS

| MATERIAL | VISCOSITY | BOILING POINT | VOLATILITY |
|---|---|---|---|
| D15 Mineral Oil | 58 cps | 385° C.* | very slow > 5000 min. |
| Dioctyl Phthalate | 58 cps | 386° C. | very slow > 5000 min. |
| Gulf 562 Oil | 60 cps | 394° C.* | very slow > 5000 min. |
| Diisodecyl Phthalate | 88 cps | 410° C. | very slow > 5000 min. |
| Tricresyl Phosphate | 104 cps | 420° C. | very slow > 5000 min. |

*Average boiling point of boiling point range.
SOURCES FOR MATERIALS & DATA
Mineral Oils:
1. Penreco; Los Angeles, California
2. Magie Bros. Oil Company; Los Angeles, California
Plasticizers and Solvents:
1. The Solvent and Chemical Companies; Los Angeles, California
2. Eastman Kodak; Kingsport, Tennessee Suitable lubricants are those usually included in ballpoint pen ink formulations and include fatty acids such as oleic, stearic and lauric acids.

Where hydrocarbon resins are shown, a suitable hydrocarbon resin is Nevchem 140 manufactured by Neville Chemical Company, Pittsburgh, Pa.

The following examples are illustrative of preferred embodiments but should not be construed in any way as limiting the present invention. In these examples components designated as volatile solvents have a boiling point less than 180° C. at atmospheric pressure and the non-volatile low viscosity solvents have a viscosity of 1–15 cps and a boiling point ranging from 180° C. to 300° C. The non-volatile substantially high viscosity solvent or plasticizer has a viscosity of 58 cps or more and a boiling point greater than 300° C. at atmospheric pressure.

EXAMPLE I-COLOR BLUE

| Components | Selected Type | % Amount by Weight |
|---|---|---|
| Elastomeric Polymer | Cis-1,4-Polyisoprene | 24 |
| Colorant | Pigment (50/50-alkali blue and victoria blue) | 18 |
| Volatile Solvent | Lacquer Diluent #6 | 28.5 |
| Non-volatile low viscosity solvent | 2257 Oil (1.5 cps) | 21 |
| Non-volatile substantially high viscosity solvent or plasticizer | Dioctyl Phthalate | 3.5 |
| Lubricants | Mixture of Oleic, Lauric and Stearic Acids (1,2,2) | 5 |
| | | 100 |

EXAMPLE II-COLOR BLUE

| Components | Selected Type | % Amount by Weight |
|---|---|---|
| Elastomeric Polymer | Cis-1,4-Polyisoprene | 22 |
| Colorant | Pigment (50/50-alkali blue and victoria blue) | 17 |
| Volatile Solvent | Lacquer Diluent #6 | 8 |
| Non-volatile low viscosity solvent | 2257 Oil (1.5 cps) | 49.5 |
| Non-volatile substantially high viscosity solvent or | Heavy Mineral Oil (Gulf 562) | |

-continued

| Components | Selected Type | % Amount by Weight |
|---|---|---|
| plasticizer | | 2.5 |
| Lubricant | Oleic Acid | 1 |
| | | 100 |

EXAMPLE III-COLOR BLUE

| Components | Selected Type | % Amount by Weight |
|---|---|---|
| Elastomeric Polymer | Cis-1,4-Polyisoprene | 24 |
| Colorant | Pigment (50/50-alkali blue and victoria blue) | 18 |
| Volatile Solvent | Lacquer Diluent #6 | 8 |
| Non-volatile low viscosity solvent | 2257 Oil (1.5 cps) | 30 |
| Non-volatile substantially high viscosity solvent or plasticizer | Dioctyl Phthalate | 14 |
| Lubricant | Oleic Acid | 2 |
| Other | Hydrocarbon Resin | 4 |
| | | 100 |

EXAMPLE IV-COLOR RED

| Components | Selected Type | % Amount by Weight |
|---|---|---|
| Elastomeric Polymer | Cis-1,4-Polyisoprene | 23.5 |
| Colorant | Pigment (Red 2B) | 20.5 |
| Volatile Solvent | Lacquer Diluent #6 | 19 |
| Non-volatile low viscosity solvent | Magie 543 Oil (1.6 cps) | 34.5 |
| Non-volatile substantially high viscosity solvent or plasticizer | — | 0 |
| Lubricants | Mixture of Oleic, Lauric and Stearic Acids (0.5,1,1) | 2.5 |
| | | 100 |

EXAMPLE V-COLOR BLUE

| Components | Selected Type | % Amount by Weight |
|---|---|---|
| Elastomeric Polymer | Cis-1,4-Polyisoprene | 23 |
| Colorant | Pigment (50/50-alkali blue and victoria blue) | 16.5 |
| Volatile Solvent | Lacquer Diluent #6 | 22 |
| Non-volatile low viscosity solvent | 2257 Oil | 35.2 |
| Non-volatile substantially high viscosity solvent or plasticizer | — | 0 |
| Lubricants | 50/50-Oleic and Lauric Acids | 3.3 |
| | | 100 |

EXAMPLE VI-COLOR BLUE

| Components | Selected Type | % Amount by Weight |
|---|---|---|
| Elastomeric Polymer | 50/50-Natsyn 2205 and SMR 5CV60 | 23.2 |
| Colorant | Pigment (50/50-alkali blue and victoria blue) | 18.1 |
| Volatile Solvent | Lacquer Diluent #6 | 20.5 |
| Non-volatile low viscosity solvent | 2257 Oil | 26.3 |
| Non-volatile substantially high viscosity solvent or plasticizer | Gulf 562 Oil | 4.9 |
| Lubricants | Mixture of Oleic, Lauric and Stearic Acids (0.5,1,1) | 2.5 |
| Other | Hydrocarbon Resin | 4.5 |
| | | 100.0 |

EXAMPLE VII-COLOR BLACK

| Components | Selected Type | % Amount by Weight |
|---|---|---|
| Elastomeric Polymer | 50/50-Natsyn 2205 and SMR 5CV60 | 24.1 |
| Colorant | Pigment (80/20-carbon black and alkali blue) | 19.1 |
| Volatile Solvent | Lacquer Diluent #6 | 20 |
| Non-volatile low viscosity solvent | 2257 Oil | 26.2 |
| Non-volatile substantially high viscosity solvent or plasticizer | Gulf 562 Oil | 4.5 |
| Lubricants | Mixture of Oleic, Lauric and Stearic Acids (0.5,1,1) | 2.5 |
| Other | Hydrocarbon Resin | 3.6 |
| | | 100.0 |

EXAMPLE VIII-COLOR BLUE

| Components | Selected Type | % Amount by Weight |
|---|---|---|
| Elastomeric Polymer | Natsyn 2200 | 22 |
| Colorant | Pigment (50/50-Alkali blue and victoria blue) | 18 |
| Volatile Solvent | Lacquer Diluent #6 | 8 |
| Non-volatile low viscosity solvent | 2257 Oil | 42 |
| Non-volatile substantially high viscosity solvent or plasticizer | Gulf 562 Oil | 5 |
| Lubricant | Oleic Acid | 1 |
| Other | Hydrocarbon Resin | 4 |
| | | 100 |

EXAMPLE IX-COLOR RED

| Components | Selected Type | % Amount by Weight |
|---|---|---|
| Elastomeric Polymer | 50/50-Natsyn 2205 and SMR 5CV60 | 26 |
| Colorant | Pigment (Red 2B) | 19 |
| Volatile Solvent | Lacquer Diluent #6 | 19 |
| Non-volatile low viscosity solvent | 2257 Oil | 30.5 |
| Non-volatile substantially high viscosity solvent or plasticizer | Plasticizer (diisodecyl phthalate) | 3 |
| Lubricants | Mixture of Oleic, Lauric and Stearic | |

| Components | Selected Type | % Amount by Weight |
|---|---|---|
| | Acids (0.5,1,1) | 2.5 |
| | | 100 |

EXAMPLE X-COLOR GREEN

| Components | Selected Type | % Amount by Weight |
|---|---|---|
| Elastomeric Polymer | 50/50-Natsyn 2205 and SMR 5CV60 | 24 |
| Colorant | Pigment-Phthalo Blue | 12 |
| | Diarylide Yellow | 7 |
| Volatile Solvent | Lacquer Diluent #6 | 19 |
| Non-volatile low viscosity solvent | 2257 Oil | 29 |
| Non-volatile substantially high viscosity solvent or plasticizer | Gulf 562 Oil | 3.5 |
| Lubricants | Mixture of Oleic, Lauric and Stearic Acids (0.5,1,1) | 2.5 |
| Other | Hydrocarbon Resin | 3 |
| | | 100 |

EXAMPLE XI-COLOR BLUE BLACK

| Components | Selected Type | % Amount by Weight |
|---|---|---|
| Elastomeric Polymer | Cis-1,4-Polyisoprene | 23.5 |
| Colorant | Pigment-Carbon Black | 17 |
| | Alkali Blue | 5 |
| Volatile Solvent | Lacquer Diluent #6 | 18 |
| Non-volatile low viscosity solvent or plasticizer | Kodaflex TXIB | 10 |
| | 2251 Oil | 10 |
| | 2257 Oil | 9.5 |
| Non-volatile substantially high viscosity solvent or plasticizer | Dioctyl Phthalate | 4.5 |
| Lubricants | Mixture of Oleic, Lauric and Stearic Acids (0.5,1,1) | 2.5 |
| | | 100 |

EXAMPLE XII-COLOR BLUE

| Components | Selected Type | % Amount by Weight |
|---|---|---|
| Elastomeric Polymer | Natsyn 2200 | 24 |
| Colorant | Pigment (victoria blue) | 11 |
| Volatile Solvent | Lacquer Diluent #6 | 30 |
| Non-volatile low viscosity solvent | 2257 Oil | 33 |
| Non-volatile substantially high viscosity solvent or plasticizer | — | 0 |
| Lubricant | Oleic Acid | 2 |
| | | 100 |

The ballpoint pen inks of this invention are more viscous than the customary glycol based ballpoint pen inks and therefore are more suitable for use in a pressurized cartridge. The exact pressure required will be dependent upon the opening between the ball and lip of the point used, the viscosity range of the final ink composition, and the amount of ink and volume of the tube used to contain the ink. It has been found that one desirable ink pressure medium is compressed air.

The pressurized cartridge utilizes a solid piston that is positioned on top of the ink supply and forwardly of the pressure producing medium. The follower has a central section that is cylindrical in shape and has its two ends formed as conical portions so that no specific orientation in assembly is required.

It is to be understood that the form of the invention herein above shown and described is to be taken as the preferred examples of the same, and that various changes in the components and the quantities thereof may be resorted to, without departing from the spirit of the invention or scope of the appended claims.

I claim:

1. The method of making an ink composition which is characterized by initial erasability by ordinary pencil erasers of a trace thereof when applied by a ball-point writing instrument to an absorbent paper-like writing surface and which trace thereafter develops permanence, said method comprising the steps of:
   (a) providing a pre-pigmented elastomer component in which pigment is substantially homogeneously distributed throughout and aggregated onto molecular chains of elastomer component;
   (b) dispersing the pre-pigmented elastomer component in a solvent system, the solvent system being present in amount sufficient to provide an ink composition having a viscosity in the range of $1-4 \times 10^6$ cps and comprising a volatile component having a boiling point less than about 180° C. and which contributes to initial erasability of an applied trace of the ink composition and an essentially non-volatile component which contributes to development of permanence of the applied trace; and
   (c) controlling initial erasability of the ink composition and capability of subsequently developing permanence when applied as a trace to the absorbent writing surface with the ball-point writing instrument by selecting, for the elastomer component of step (a), elastomeric materials which exhibit predetermined molecular weight distribution over a wide molecular weight range and by milling the pigment into the elastomer component in the absence of the solvent system to provide the pre-pigmented elastomer component of step (a), and by selecting, for the essentially non-volatile component of step (b), a liquid having a boiling point in the range 180°–300° C. and a viscosity in the range 1–15 cps.

2. The method as defined in claim 1 wherein the elastomer component has a molecular weight range of about 100,000 to about 900,000.

3. The method as defined in claim 2 wherein the elastomer component has a molecular weight distribution which is substantially uniform over said molecular weight range.

4. The method as defined in claim 1 wherein said elastomer component consists of natural and synthetic rubbers milled to a Mooney consistency of from 17 to 27 prior to the incorporation of pigment.

5. The method as defined in claim 1 or 2 wherein the control of step (c) is also effected by providing, as the volatile component of step (b), a low boiling point solvent having a boiling point less than about 180° C. in amount of about 8 to about 30% by weight of ink and, in the essentially non-volatile component, about 21–50.5% by weight of ink of a low viscosity hydrocarbon oil having a boiling point less than about 300° C. and greater than about 180° C.

6. The method of making an ink composition which is characterized by its initial erasability by ordinary pencil erasers when applied by a ball-point writing instrument to an absorbent paper-like writing surface and which thereafter develops permanence, said method comprising the steps of:
(a) selecting elastomeric material from the group consisting of natural rubbers, synthetic rubbers and mixtures thereof, said elastomeric material having a low level of hard resinous gel particles and an extremely low level of retained dirt which is no more than 0.05% by weight;
(b) masticating said selected elastomeric material by subjecting same to high shear stresses within the range of about $2.0 \times 10^6$ to $2.0 \times 10^7$ KG. Meter sec$^{-2}$(Newtons) to soften said elastomeric material to a Mooney viscosity within the range of about 17 to 27;
(c) coloring said masticated elastomeric material by introducing colored pigment into said masticated elastomeric material while subjecting same to further shear stresses so as to forcibly impregnate said material with pigment, said color pigment being selected from the group consisting of dry pigment, flushed pigment and a paste consisting of pigment dispersed in a rubber compatible vehicle, said forced impregnation thereby distributing color uniformly among the various chain lengths of said elastomeric material;
and
(d) mixing said pigmented elastomeric material with a solvent system to form an erasable ink composition having a viscosity in the range $1 \times 10^6$–$4 \times 10^6$ cps, said solvent system comprising a volatile component and an essentially non-volatile component in which the volatile component has a boiling point less than about 180° C. and said essentially non-volatile component is at least predominantly a low viscosity hydrocarbon oil having a viscosity in the range 1–15 cps and a boiling point less than about 300° C. and greater than about 180° C., and which includes less than 15% by weight of the erasable ink composition of a high viscosity material having a boiling point greater than 300° C.

7. In a ball point writing instrument containing an ink capable of depositing a trace on an absorbent, paper-like writing surface having minute voids therein, said trace being characterized by initial erasability thereof by ordinary pencil erasers and developing permanence over a period of time, said ink comprising pre-pigmented elastomer dispersed in a solvent system, said pre-pigmented elastomer comprising a pigment and an elastomer component in which the elastomer component has a Mooney viscosity within a desired range and the pigment is force impregnated into the elastomer component prior to the pre-pigmented elastomer being dispersed in the solvent system, said pre-pigmented elastomer comprising about ⅓ to ⅔ by weight of the ink and said solvent system comprising a volatile component and an essentially non-volatile component both of which are solvents for the elastomer component and in which the volatile component has a 100% evaporation rate of less than about 60 minutes and said essentially non-volatile component has a 100% evaporation rate of more than about 1200 minutes, said volatile component being present in amount of about 8 to 30% by weight of the ink, said essentially non-volatile component being present in amount of about 21–50.5% by weight of the ink and having a viscosity which is sufficiently low as to result in a final ink viscosity of between $1 \times 10^6$–$4 \times 10^6$ cps.

8. In a ball point writing instrument as defined in claim 7 wherein said pre-pigmented elastomer is selected from the group consisting of pre-pigmented natural rubbers, pre-pigmented synthetic rubbers and mixtures thereof.

9. In a ball point writing instrument as defined in claim 8 wherein said pre-pigmented elastomer comprises a mixture of natural and synthetic rubbers in approximately equal amounts.

10. In a ball point writing instrument as defined in claim 7 wherein said low viscosity component has a viscosity range of 1–15 cps.

11. In a ball point writing instrument as defined in claim 10 wherein said essentially non-volatile component contains a solvent present in an amount of less than 15% by weight of the ink having a viscosity of greater than about 58 cps and a boiling point of more than 300° C. at atmospheric pressure.

12. The method of making an ink composition which is characterized by initial erasability by ordinary pencil erasers of a trace thereof when applied by a ball point writing instrument to an absorbent paperlike writing surface and which trace thereafter develops permanence, said method comprising the steps of:
(a) milling a pigment into elastomer to provide a pre-pigmented elastomer component in which pigment is substantially homogeneously distributed throughout and aggregated onto molecular chains of elastomer;
(b) dispersing the pre-pigmented elastomer in a solvent system, the solvent system being present in amount sufficient to provide an ink composition having a viscosity in the range of $1 \times 10^6$–$4 \times 10^6$ cps and comprising a volatile component having a boiling point less than about 180° C. and which contributes to initial erasability of an applied trace of the ink composition and an essentially non-volatile component which contributes to development of permanence of the applied trace and to increased writing smoothness of the ink composition when applied as a trace, said volatile and essentially non-volatile components being solvents for the elastomer component and said essentially non-volatile component having a sufficiently low viscosity as to result in ink composition having a viscosity in said range thereof.

13. An ink composition made by the method of any one of claims 1, 6 or 12.

14. The method defined in claim 1 wherein said pre-pigmented elastomer component is provided by first milling the elastomer component to a selected Mooney viscosity range and then adding pigment to such milled elastomer component and continuing such milling until the pigment is substantially homogeneously distributed throughout and aggregated onto molecular chains of the elastomer component.

15. The method as defined in claim 14 wherein said elastomer component consists of substantially equal amounts of natural and synthetic rubbers milled to a Mooney consistency of from 17 to 27 prior to the incorporation of pigment.

16. The method defined in claim 1 or 14 wherein said essentially non-volatile component having a viscosity in the range 1–15 cps and a boiling point in the range 180°–300° C. also has a 100% evaporation rate of more than 1200 minutes and is present in amount of about 21–50.5% by weight of the ink composition.

17. The method as defined in claim 16 wherein the essentially non-volatile component is a hydrocarbon oil.

18. The method as defined in claim 17 wherein said essentially non-volatile component also includes a solvent present in an amount less than 15% by weight of the ink composition, having a viscosity greater than about 58 cps and a boiling point greater than about 300° C.

* * * * *